United States Patent [19]
Trussell et al.

[11] 3,886,450
[45] May 27, 1975

[54] WIRELESS PORTABLE TACHOMETER

[75] Inventors: Gerald C. Trussell, Chicago; James R. Caruth, Des Plaines, both of Ill.

[73] Assignee: Sun Electric Corporation, Chicago, Ill.

[22] Filed: Aug. 6, 1973

[21] Appl. No.: 386,033

[52] U.S. Cl. .............................. 324/170; 324/16 R
[51] Int. Cl. ............................................. G01p 3/48
[58] Field of Search............ 324/15, 16 R, 165, 169, 324/170

[56] References Cited
UNITED STATES PATENTS

| | | | |
|---|---|---|---|
| 2,926,301 | 2/1960 | Westberg | 324/16 |
| 3,601,773 | 8/1971 | Frieling | 324/170 |
| 3,793,583 | 2/1974 | Glomski | 324/15 |
| 3,811,089 | 5/1974 | Strzelewicz | 324/170 |

OTHER PUBLICATIONS

Build Your Own "Wireless" Tach, R. M. Bemrey, Popular Science, March 1965, pp. 110–112.
Build A Wireless Tach For Small Engines, H. Cohen, Mechanix Illustrated, April 1973, pp. 118, 122, 123.

*Primary Examiner*—Alfred E. Smith
*Assistant Examiner*—Rolf Hille
*Attorney, Agent, or Firm*—Molinare, Allegretti, Newitt & Witcoff

[57] ABSTRACT

Apparatus for measuring the operating speed (RPM) of an internal combustion engine without attachment to the engine. The apparatus basically includes antenna input means having a resonant frequency for receiving the radiation signals emitted by the engine with each spark plug firing and for generating a resonating voltage signal in response to each radiation signal, tuning or filter means for passing frequencies within a bandwidth including the resonant frequency, amplitude detection means for discriminating the resonating voltage signal from accompanying noise and for generating a control pulse in response to each resonating signal, and output means for displaying the measured RPM in response to the control pulse repetition rate.

29 Claims, 9 Drawing Figures

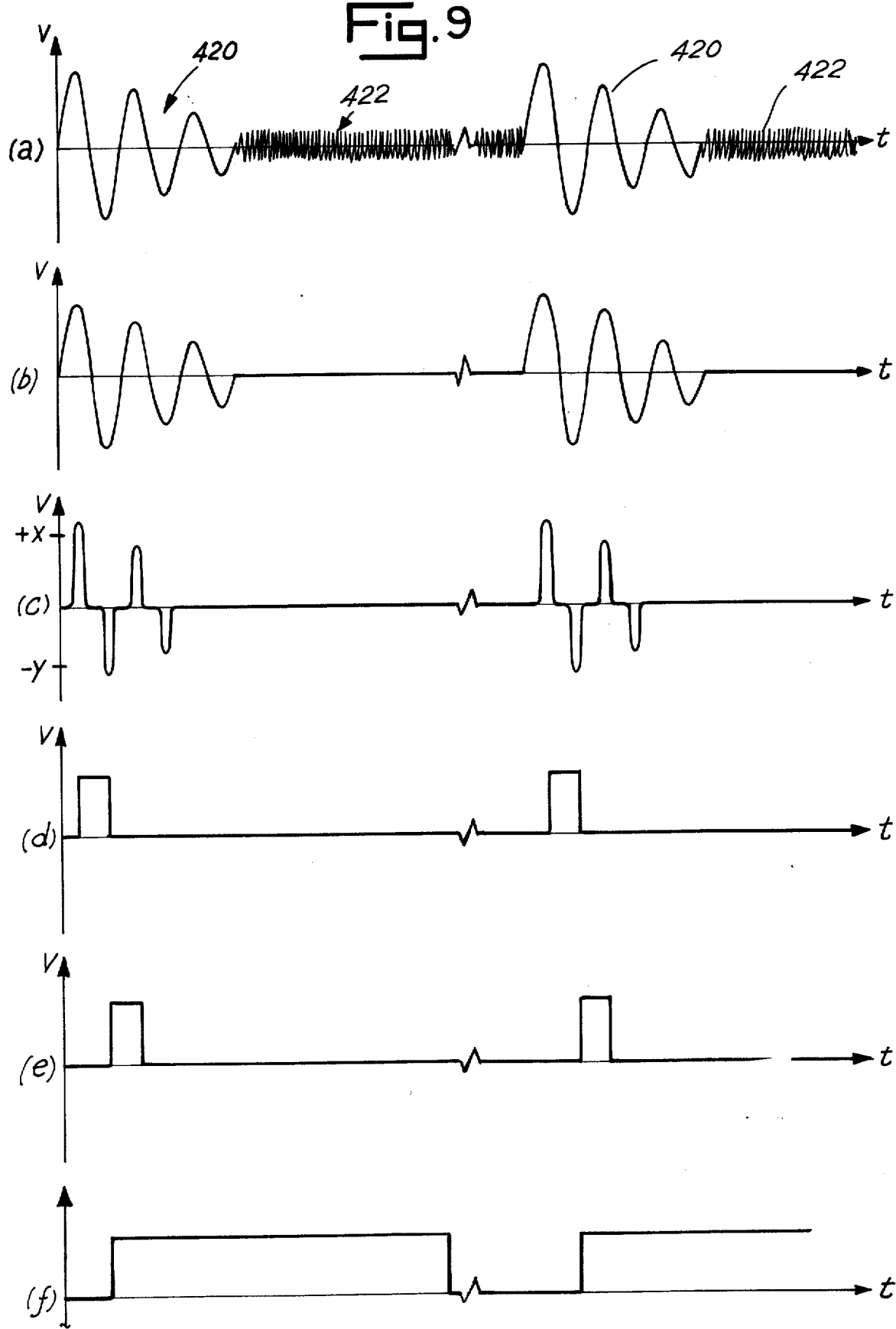

WIRELESS PORTABLE TACHOMETER

BACKGROUND OF THE INVENTION

The present invention relates generally to apparatus and method for measuring the operating speed (RPM) of an internal combustion engine, and more particularly, to a wireless portable tachometer.

Substantially all presently known tachometers require attachment or coupling to the engine of the automobile being tested. As far as the Applicants know, a wireless portable tachometer which can accurately determine the speed of an engine is not available, despite the fact that such a tachometer would be very desirable.

This is a direct result of the extremely difficult design problems presented by such a device. It is known that the ignition system of an automobile emits an electromagnetic radiation signal caused by the spark plug firing. However, this radiation signal is a very complex one having multifrequency components. As a result, the signal is readily lost in the multitude of signals being transmitted through the air, including television and radio signals.

In addition, tachometers are generally used in automobile centers where several different automobiles are being tested or repaired. Thus, even if the radiation signals could be found, the problem of distinguishing the sources of the signals, i.e., the various automobiles in the area, remains unsolved.

SUMMARY OF THE INVENTION

Applicants have discovered that the radiation signals emitted by the automobile engine include a high-energy component having a frequency in the autio range of 5 kilohertz to 30 kilohertz. As disclosed in detail below, this high-energy component is received by antenna input means and produces a corresponding signal which is superimposed on the other signals, or noise, received by the antenna input means.

Elimination, or attenuation, of frequencies outside this audio range of 5 KHZ to 30 KHZ results in a signal wherein the amplitude peaks of the voltage signal corresponding to the radiation signal component are substantially larger than the noise amplitude. These signals are detected by valid signal detection means on the basis of amplitude, and control pulses are generated in response to each voltage signal. Output means convert the repetition rate of the control pulses into a meter reading corresponding to the measured RPM.

In a principal aspect, the present invention therefore comprises antenna input means for receiving the radiation signals and for producing a voltage signal in response thereto, turnable means for substantially eliminating frequencies outside the audio range, valid signal detection means for generating a control pulse in response to each voltage signal having an amplitude exceeding a predetermined value, and output means responsive to the repetition rate of the control pulses for displaying the measured RPM.

It is thus an object of the present invention to provide a wireless portable tachometer which operates without attachment or coupling to the automobile engine being tested.

It is also an object of the present invention to provide a wireless portable tachometer which is impervious to and unaffected by other near-by ignition systems.

It is a further object of the present invention to provide a wireless portable tachometer which will operate with the engine hood closed.

It is also an object of the present invention to provide a wireless portable tachometer which discriminates valid ignition signals on the basis of amplitude and time criteria.

BRIEF DESCRIPTION OF THE DRAWINGS

These objects and others which will become apparent in the detailed description which follows are accomplished by the present invention which will be described with reference to the drawings wherein:

FIG. 9 includes graphs of voltage at various points of the preferred embodiment shown in FIG. 1 during operation.

DESCRIPTION OF THE PREFERRED EMBODIMENT

Apparatus

Figure 1:
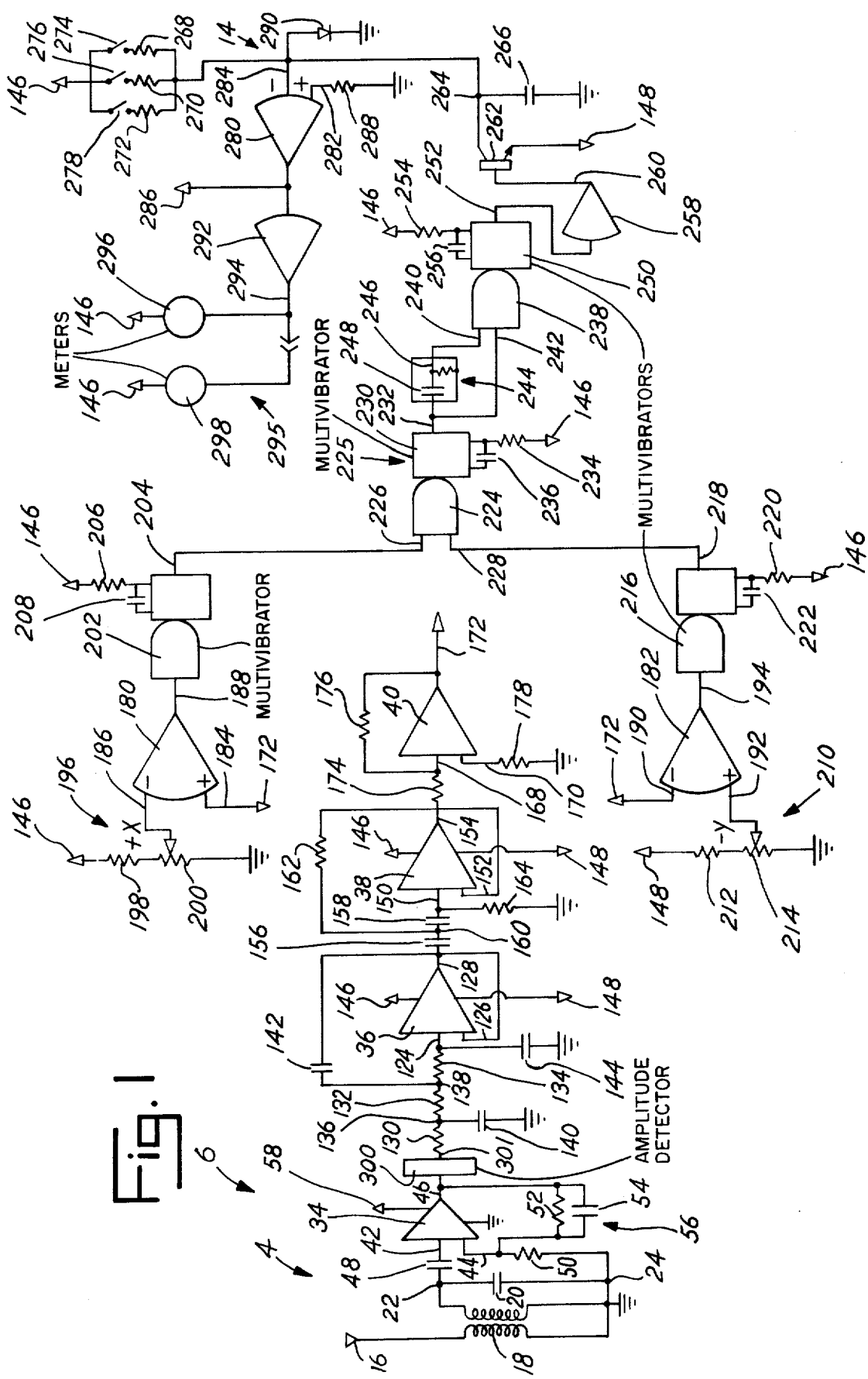
FIG. 1 is a schematic diagram of a preferred embodiment of the present invention.

Referring to FIG. 1, a preferred embodiment of the present invention is shown schematically and generally designated as apparatus 2. The apparatus 2 basically comprises antenna input means 4, frequency discriminator means 6, valid signal detection means 8, and output means 14.

More specifically, antenna input means 4 includes a broad band wave trap antenna 16. The antenna 16 forms the inductive leg of a parallel tank circuit 18. The tank circuit 18 is shunted by a tuning capacitor 20 between a pair of nodes 22, 24.

Figure 2:
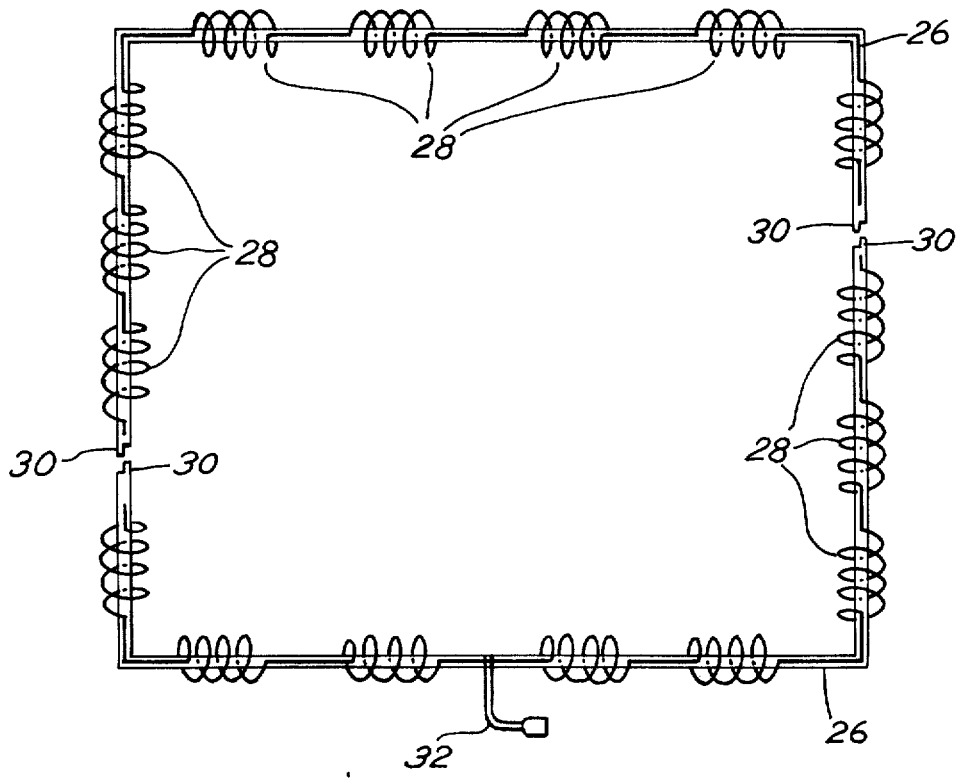
FIG. 2 is an exploded view of an antenna for use in the preferred embodiment shown in FIG. 1.

The antenna 16 is shown in detail in FIG. 2. The antenna 16 includes a pair of one-half-inch diameter rods, similarly designated 26, which are substantially U-shaped. A series of coils, shown schematically and generally designated 28, are positioned about the rods 26. The coils 28 are electrically connected in series. Each coil 28 has approximately 200 turns.

The ends 30 of the rods 26 are notched to facilitate connection. This connection is achieved by coating the notches with methylene chloride ($CH_2CL_2$) and clamping the rods 26 together until the chemical drys.

The antenna 16 also includes a coaxial cable and plug, generally designated 32, for attachment to the remainder of the apparatus 2 shown in FIG. 1. The antenna 16 is covered by heat shrink rubber tubing (not shown).

Referring again to FIG. 1, the apparatus 2 includes amplifier means, generally designated 34, threshold voltage detection means 300, an active low-pass filter 36, an active high-pass filter 38, and a large signal bandwidth amplifier 40. The amplifier means 34 is a large band width amplifier having a pair of input terminals 42, 44 and an output terminal 46. The input terminal 42 is connected to node 22 through a capacitor 48. The input terminal 44 is connected to node 24 through a resistor 50.

The output terminal 46 of the amplifier means 34 is connected to the input terminal 44 through a parallel combination of a resistor 52 and a capacitor 54. The resistor 52 and the capacitor 54 form a feedback loop, generally designated 56. The reverse transmission factor of the feedback loop 56 adds parametric stability and controls the frequency characteristics of the amplifier means 34.

Figure 3:
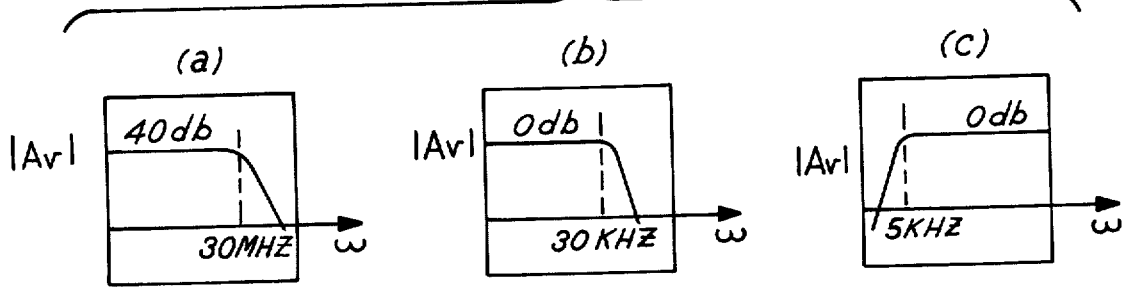
FIG. 3 includes graphs showing the frequency characteristics of various amplifiers and filters for use in the preferred embodiment shown in FIG. 1.

The frequency characteristics of the amplifier means 34 are shown in FIG. 3a. The characteristics are substantially flat from DC to approximately 30 MHZ with a total gain of 40 db. Beyond 30 MHZ, the gain of the amplifier means 34 drops off at 6 db per octave.

The amplifier means 34 is a non-inverting amplifier system and the output signal at terminal 46 is in phase with the input signal received by the antenna 16. The amplifier means 34 is impedance matched to the antenna 16. The amplifier means 34 is biased by means of a positive 6-volt power supply, generally designated 58.

Figure 4:
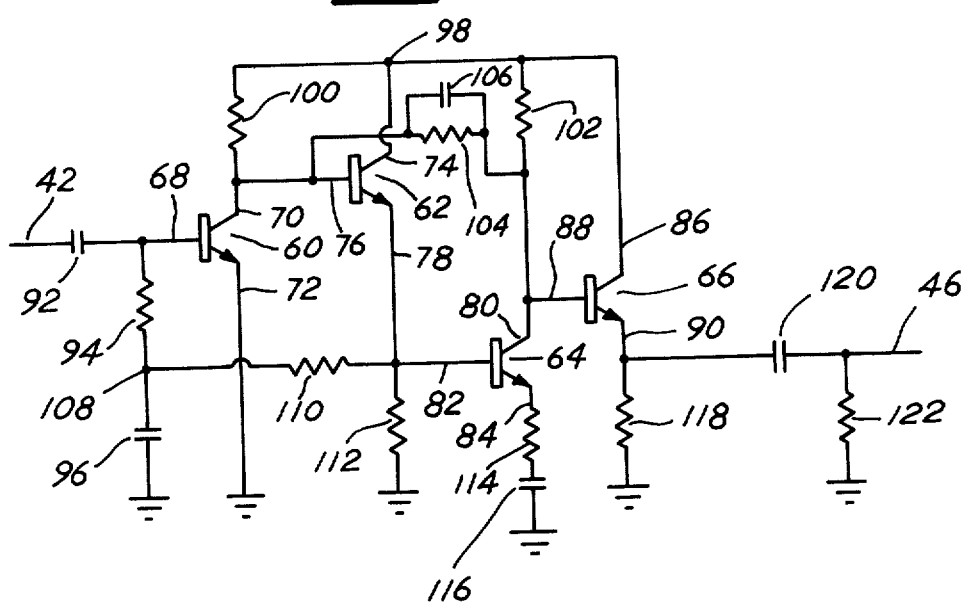
FIG. 4 is a schematic diagram of an amplifier for use in the preferred embodiment shown in FIG. 1.

In FIG. 4, the amplifier means 34 is shown in greater detail. The amplifier means 34 includes a series of transistors 60, 62, 64, 66. A series of nodes 68, 70, 72 are associated with the transistor 60. Similarly, nodes 74, 76, 78 are associated with the transistor 62, nodes 80, 82, 84 are associated with the transistor 64, and nodes 86, 88, 90 are associated with transistor 66.

The input terminal 42 of the amplifier means 34 is connected to node 68 through a capacitor 92. Node 68 is connected to ground through the series combination of a resistor 94 and a capacitor 96. Node 72 is also grounded. Node 70 is connected with a node 98 through a resistor 100. Node 98 is connected to node 74 and to node 88 through a resistor 102. Node 88 is connected to node 80.

Node 76 is connected to node 88 through the parallel combination of a resistor 104 and a capacitor 106. A node 108, between the resistor 94 and the capacitor 96, is connected to node 82 through a resistor 110. Node 78 is connected to node 82. Node 82 is connected to ground through a resistor 112.

Node 84 is connected to ground through the series combination of a resistor 114 and a capacitor 116. Node 98 is connected to node 86. Node 90 is connected to ground through a resistor 118. Node 90 is also connected to output terminal 46 of the amplifier means 34 through a capacitor 120. The output terminal 46 is connected to ground through a resistor 122.

The resistor 94 and the resistor 110 form a voltage shunt feedback for frequency and DC bias stability. The resistor 94 and the resistor 110 also reduce the input and output impedance of the amplifier means 34. The output impedance of the amplifier means 34 is 52 ohms, thereby reducing capacitive loading effects.

Referring again to FIG. 1, the threshold voltage detection means 300 is connected to the output terminal 46. The detection means 300, to be described in detail later with reference to FIG. 5, has an output terminal 301.

The low-pass filter 36 has a pair of input terminals 124, 126 and an output terminal 128. The output terminal 301 of the detection means 300 is connected to the input terminal 124 through a series of resistors 130, 132, 134. The resistors 130, 132 are separated by a node 136, and the resistors 132, 134 are separated by a node 138.

Node 136 is connected to ground through a capacitor 140. Node 138 is connected to the output terminal 128 through a capacitor 142. The input terminal 124 is connected to ground through a capacitor 144. The output terminal 128 and the input terminal 126 are shorted. The low-pass filter 36 is biased by means of a positive 15-volt power supply, generally designated 146, and a negative 15-volt power supply, generally designated 148.

As shown, the low-pass filter 36 is a three-pole active filter. The first pole is determined by the resistor 130 and the capacitor 140, the second pole by the resistor 132 and the capacitor 142, and the third pole by the resistor 134 and the capacitor 144. The three poles determine the first, second and third break frequencies of the low-pass filter 36.

The frequency characteristics of the low-pass filter 36 are shown in FIG. 3b. Generally speaking, the low-pass filter 36 has unity gain up to 30 KHZ, and beyond 30 KHZ, the gain falls off at 18 db per octave.

The high-pass filter 38 has a pair of input terminals 150, 152 and an output terminal 154. The input terminal 152 and the output terminal 154 are shorted.

The output terminal 128 of the low-pass filter 36 is connected to the input terminal 150 through a pair of capacitors 156, 158. The capacitors 156, 158 are separated by a node 160.

Node 160 is connected to the output terminal 154 through a resistor 162. The input terminal 150 is connected to ground through a resistor 164. The high-pass filter 38 is biased by means of the power supply 146 and the power supply 148.

As shown, the high-pass filter 36 is a 2-pole active filter. The frequency characteristics of the high-pass filter 38 are shown in FIG. 3c. The high-pass filter 38 has unity gain for frequencies above 5KHZ and the gain rolls off, below 5 KHZ, at 12 db per octave.

The tank circuit 18, tuning capacitor 20, low-pass filter 36 and high-pass filter 38 cooperate to define the frequency discriminator means 6. Frequency discriminator means 6 is tunable means for eliminating all frequencies outside of a predetermined frequency band. Thus, undesirable low and high frequency signals are substantially attenuated.

The amplifier 40 has a pair of input terminasls 168, 170 and an output terminal 172. The input terminal 168 is connected to the output terminal 154 of the high-pass filter 38 through a resistor 174. The input terminal 168 is also connected to the output terminal 172 through a resistor 176. The input terminal 170 is connected to ground through a resistor 178.

Valid signal detection means 8 includes a pair of peak level discriminators 180, 182. The peak level discriminator 180 is a positive peak discriminator having a positive input terminal 184, a negative input terminal 186, and an output terminal 188. The pulse level discriminator 182 is a negative peak discriminator having a negative input terminal 190, a positive input terminal 192, and an output terminal 194.

With respect to the positive peak discriminator 180, the positive input terminal 184 is connected to the output terminal 172 of the amplifier 40. The negative input terminal 186 is connected to a variable reflective voltage network, generally designated 196. The voltage network 196 includes a resistor 198 and a potentiometer 200. As shown, the resistor 198 is connected to the power supply 146 and the potentiometer 200 is grounded.

The output terminal 188 of the positive peak discriminator 180 is connected to a monostable multivibrator 202 having an output terminal 204. When triggered, the monostable multivibrator 202 generates a pulse of predetermined duration. The time constant of the monostable multivibrator 202 is determined by the combination of a resistor 206 and a capacitor 208.

In a similar fashion, the negative input terminal 190 of the negative peak discriminator 182 is connected to the output terminal 172 and the positive input terminal 192 is connected to a variable reflective voltage network 210, including a resistor 212 and a potentiometer 214. The output terminal 194 of the negative peak discriminator 182 is connected to a monostable multivibrator 216 having an output 218. The time constant of the multivibrator 216 is determined by a resistor 220 and a capacitor 222.

Valid signal detection means 8 also includes a coincidence gate 224 and blanking means, generally designated 225. The coincidence gate 224 has a pair of input terminals 226 and 228. The input terminal 226 is connected to the output terminal 204 of the monostable multivibrator 202. The input terminal 228 is connected to the output terminal 218 of the multivibrator 216.

The coincidence gate 224 is connected to, or associated with, blanking means 225. Blanking means 225 comprises a monostable multivibrator 230 having an output terminal 232. When triggered by the coincidence gate 224, the monostable multivibrator 230 generates a pulse of predetermined duration. A resistor 234 and a capacitor 236 set the time constant for the monostable multivibrator 230.

Valid signal detection means 8 also includes a gate circuit 238 having a pair of input terminals 240, 242. The input terminal 242 is connected to the output terminal 232 of the monostable multivibrator 230. The input terminal 240 is connected to the output terminal 232 through a passive element differentiator, generally designated 244. The differentiator 244 includes a resistor 246 and a capacitor 248.

The gate circuit 238 is associated with a monostable multivibrator 250, which, when activated, will generate a pulse of predetermined duration. The monostable multivibrator 250 has an output terminal 252, and the time constant of the monostable multivibrator 250 is controlled by a resistor 254 and a capacitor 256, as shown.

The output terminal 252 of the monostable multivibrator 250 is connected to an inverting amplifier 258 having an output 260. The output 260 is connected to the base of a transistor 262. The emitter of the transistor 262 is connected to the negative 15-volt power supply 148. The collector is connected to a node 264. Node 264 is the input terminal of the output means 14. Node 264 is connected to ground through a timing capacitor 266. Node 264 is also connected to the power supply 146 through the parallel combination of resistors 268, 270, 272 and switches 274, 276 and 278, as shown. The resistors 268, 270, 272 are scaling components which control the recharging of the timing capacitor 266 and correspond to the number of cylinders in the automobile being tested. Thus, switch 274 is closed for a four cylinder automobile, switch 276 for a six cylinder, and switch 278 for an eight cylinder.

Output means 14 also includes a high gain operational amplifier 280 having a positive input terminal 282, a negative input terminal 284, and an output terminal 286. The operational amplifier 288 is employed as a voltage level comparator.

The positive input terminal 282 is connected to ground through a resistor 288. The negative input terminal 284 is connected to ground through a clamping diode 290. The negative input terminal 284 is also connected to node 264.

The output terminal 286 of the operational amplifier 280 is connected to a transistor switch 292 having an output terminal 294. The output terminal 294 is connected to display means, generally designated 295.

Display means 295 includes the parallel combination of display meters 296, 298. The display meters 296, 298 are similar, but the display meter 298 is remote from the apparatus 2.

Figure 5:
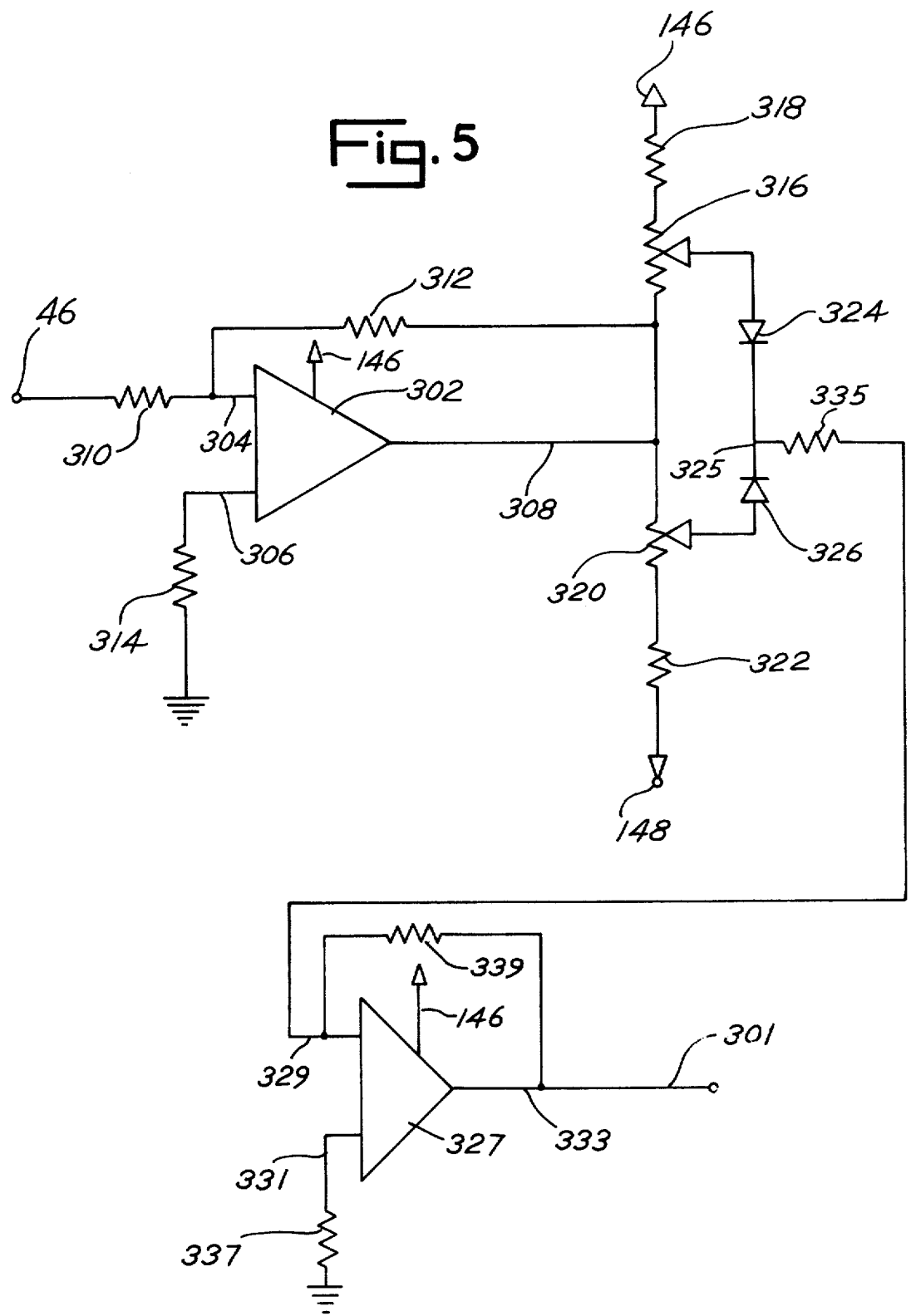
FIG. 5 is a schematic diagram of a threshold voltage detection circuit for use in the preferred embodiment shown in FIG. 1.

The detection means 300 is shown in detail in FIG. 5. The detection system 300 includes an amplifier 302 having a pair of input terminals 304, 306 and an output terminal 308. The input terminal 304 is connected to the output terminal 46 of the amplifier means 34 through a resistor 310. The input terminal 304 is also connected to the output terminal 308 through a resistor 312. The input terminal 306 is connected to ground through a resistor 314. The amplifier 302 is biased by means of the power supply 146.

The output terminal 308 of the amplifier 302 is connected to the positive 15-volt power supply 146 through the series combination of a potentiometer 316 and a resistor 318. The output terminal 308 is connected to the negative 15-volt power supply 148 through a potentiometer 320 and a resistor 322.

The potentiometer 316 is connected to a node 325 through a positive detection diode 324. The second potentiometer 320 is connected to node 325 through a negative detection diode 326.

The detection means 300 also includes an amplifier 327 having a pair of input terminals 329, 331 and an output terminal 333. The input terminal 329 is connected to node 325 through a resistor 335. The input terminal 331 is connected to ground through a resistor 337. The output 333 is connected to the input terminal 301 of the detection means 300 and to the input terminal 329 through a resistor 339. The amplifier 327 is also biased by the power supply 146.

Figure 6:
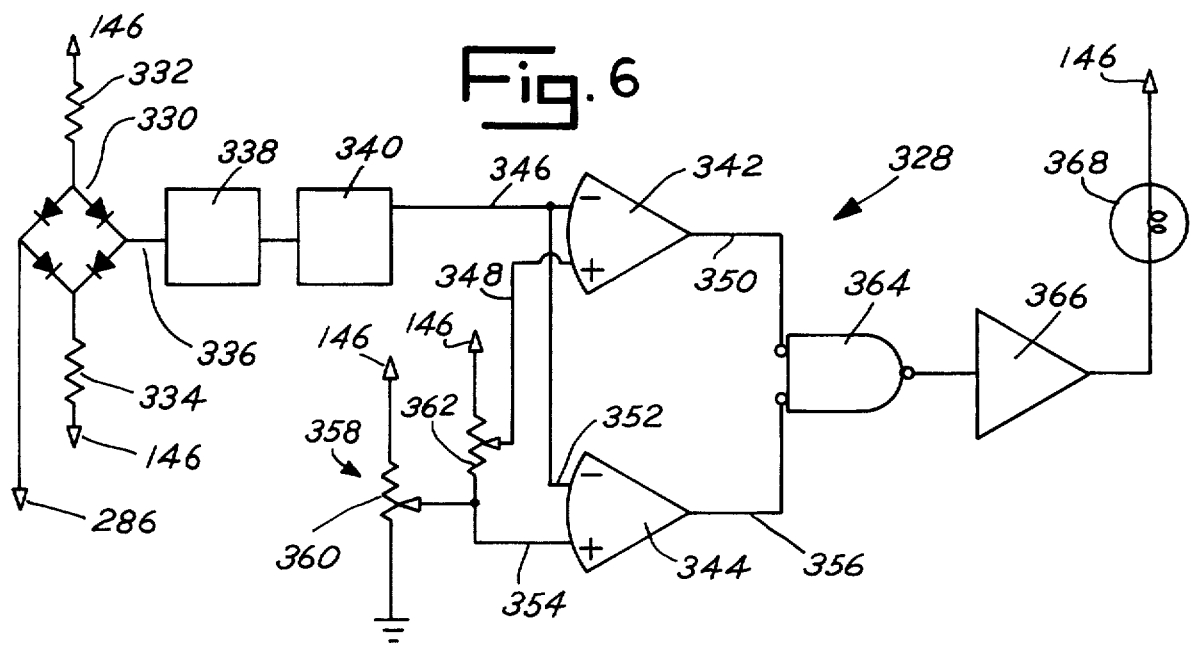
FIG. 6 is a schematic diagram of a speed band detection means for use in the preferred embodiment in FIG. 1.

Referring now to FIG. 6, a second embodiment of output means 14 is shown and generally designated as speed band detection means 328. As shown, the operational amplifier 280 drives a balanced diode bridge gate 330. The diode bridge gate 330 is connected through a resistor 332 to the power supply 146 and through a resistor 344 to the power supply 148. An output terminal 336 of the diode bridge gate 330 is connected to a pair of cascaded two pole resistive-capacitive low-pass filters 338, 340.

The low-pass filter 340 is connected to a pair of comparators 342, 344. The comparator 342 has a pair of input terminals 346, 348 and an output terminal 350. The comparator 344 has a pair of input terminals 352, 354 and an output terminal 356. The low-pass filter 340 is connected to the input terminal 346 of the comparator 342 and the input terminal 352 of the comparator 344.

Biasing voltages are supplied to the comparators 342, 344 by means of a variable voltage supply, generally designated 358. As shown, the variable voltage supply 358 includes a pair of potentiometers 360, 362 which are both connected to the power supply 146. The comparator outputs 350, 356 are connected to a diode AND gate 364, and AND gate 364 is connected through an amplifier 366 to an indicator lamp 368.

Figure 7:
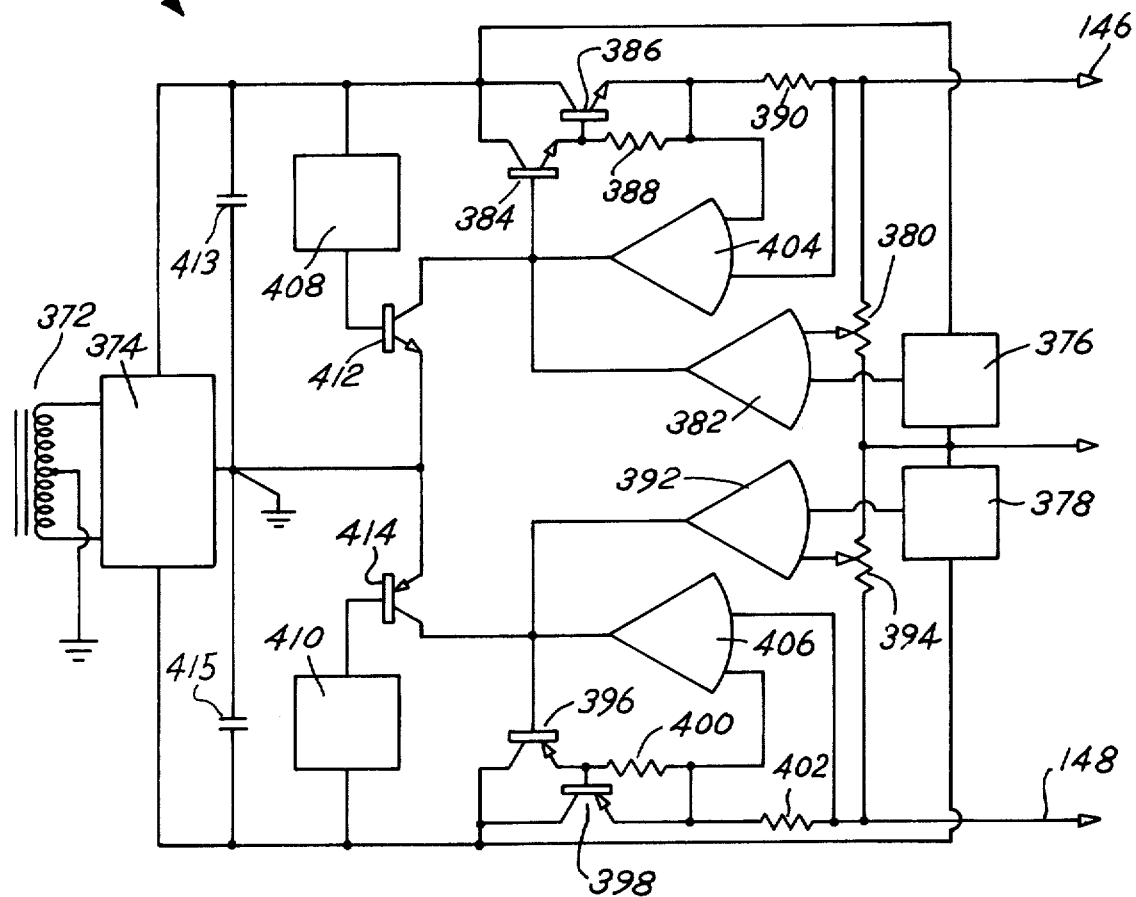
FIG. 7 is a schematic diagram of a power supply for use in the preferred embodiment shown in FIG. 1.

The power supply used in the apparatus 2 is shown in FIG. 7. The power supply, generally designated 370, delivers regulated outputs of positive 15 volts at 146 and negative 15 volts at 148. The positive 6-volt power supply 58 is produced by voltage divider means (not shown).

As shown, the power supply 370 includes a transformer 372 and a full wave rectifier 374. The rectified DC voltages are plus 27 volts and minus 27 volts and are unregulated.

The full wave rectifier 374 is connected to a positive reference voltage pre-set 376 and a negative reference voltage pre-set 378. The pre-sets 376, 378 are basically similar and comprise a constant current source (not shown) and a zener diode (not shown). The temperature coefficients of the constant current source and the zener diode effectively cancel each other, and thus, the pre-sets 276, 378 are not temperature sensitive.

The output of the positive pre-set 378 is compared with the voltage across a potentiometer 380 by means of a high gain differential amplifier 382. The potentiometer 380 is connected to the voltage supply line 146.

The output of the differential amplifier 382 drives a pair of transistors 384, 386. The emitter of the transistor 384 is connected to the emitter of the transistor 386 through a resistor 388. The emitter of the transistor 386 is connected to the power supply line 146 through a resistor 190. The feedback differential amplifier 382 maintains the output voltage at 146 within plus or minus 1 millivolt.

The negative 15-volt power supply 148 is similarly controlled by a feedback differential amplifier 392, a potentiometer 394, a pair of transistors 396, 398 and a pair of resistors 400, 402.

The power supply 370 also includes a pair of current limiting amplifiers 404, 406. The operation of the current limiting amplifiers 404, 406 is substantially identical and only the operation of current limiting amplifier 404 will be described. In parentheses, the elements corresponding to and associated with current limiting amplifier 406 are identified.

The current limiting amplifier 404 (406) senses the current in the resistor 390 (402). Excessive current causes the current limiting amplifier 404 (406) to turn "on", thus removing the base current from the transistor 394 (398). This turns "off" the transistors 384, 386 (396, 398), and thus provides short circuit protection to keep an excessively high current from damaging the pre-sets 376, 378.

In addition, the power supply 370 includes a pair of over-voltage detectors 408, 410. As shown, the detectors 408, 410 are connected to a pair of transistors 412, 414, respectively.

The operation of the over-voltage detectors 408, 410 is also substantially identical and only the operation of detector 410 will be described, the elements corresponding to over-voltage detector 408 being identified in parentheses. An excessive input voltage to the over-voltage detector 410 (408) will cause a base current to flow out of the transistor 414 (412). This, in turn, draws base current from the transistors 396, 398 (384, 386), and thereby, turns "off" the power supply 370.

The capacitors 413, 415 are input filters for the transistors 384, 396, respectively, and operate as drivers for the transistors 386, 398, respectively. The output voltage levels at 146, 148 are determined by the potentiometers 380, 392, respectively.

Operation

It should be pointed out that the operational theory of the apparatus 2 is not precisely known. The portions of this application which relate to operational theory are, therefore, only Applicant's attempt to explain the operation and should not be construed as a limitation on the present invention.

Figure 8:
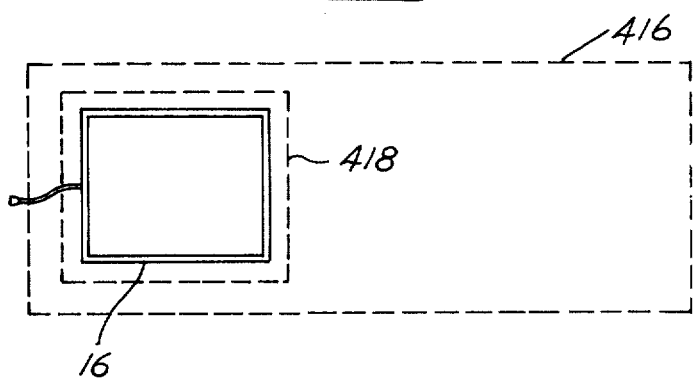
FIG. 8 is a perspective view of an antenna for use in the preferred embodiment of FIG. 1 shown in relation to an automobile being tested.

To measure the RPM of an automobile, symbolically shown in phantom in FIG. 8 at 416, the operator of the apparatus 2 slides the antenna 16 under the automobile 416. FIG. 8 also shows the orientation of the antenna 16 with respect to the automobile 416. The antenna 16 lies on the floor below the engine block, shown in phantom at 418. It should be pointed out, however, that the antenna 16 may be rigidly secured in the floor of the automobile testing stall. The automobile 416 to be tested would then be driven to a predetermined position over the antenna 16.

Once the automobile 416 and the antenna 16 are properly aligned, the operator selects the proper resistor 274, 276 or 278, corresponding to the number of cylinders in the automobile, by closing the proper switch 274, 276 or 278. The power supply 370 is turned "on".

With the motor running, the ignition system of the automobile 416 intermittently emits radiation signals which result from the firing of the spark plugs. These radiation signals are received by the antenna 16. In response thereto, the antenna input means 4 and tank circuit 18 resonate or ring. That is, the component of the radiation signal having a frequency substantially equal to the resonant frequency of the antenna input means 4 causes the antenna input means 4 to ring.

Applicants have discovered that the amplitude of the resonating voltage signal is large when one of the resonant frequencies of the antenna input means 4 is in the range of 5 KHZ to 30 KHZ, hereinafter referred to as the audio range. The resonating signal is particularly large when the resonant frequency is approximately 10 KHZ. This is significant because a relatively low-frequency signal, such as a 10 KHZ signal, is substantially attenuated with distance from its source. Thus, this component of the ignition radiaion signal will be relatively weak at a given distance from the automobile 416. As such, the radiation signals from automobiles 416 removed from the apparatus 2 will not affect, or cause resonance, in the apparatus 2. The apparatus 2 is, therefore, impervious to these ignition systems.

As previously noted, the antenna 16 is a broad band antenna. It is so designed because the resonant frequency of the antenna input means 4 will vary due to external conditions, such as the size of the automobile being tested. The tuning capacitor 20 is selectively adjusted to the resonant frequency of the antenna input means 4.

The antenna input means 4, as a resonating input system, and the tuning capacitor 20, are significant features of the present invention because the combination effectively converts the complex radiation signal emitted by the automobile engine into a relatively simple signal, including the resonating voltage and accompnaying noise. The simplicity of this signal, in turn, simplifies the filtering and testing of the signal, which will be described in detail below.

The voltage signal at the output terminal of the amplifier means 34 appears in FIG. 9a. As previously discussed, the signal includes the resonating voltage signal, designated 420, and noise, designated 422. It is significant to note that the peak amplitudes of the resonating voltage signal 420 are substantially larger than the amplitude of the noise signal 422. This signal is then filtered by means of the low-pass filter 36 and the high-pass filter 38 and again amplified by the amplifier 40. The voltage wave form appearing at the output terminal 172 of the amplifier 40 is shown in FIG. 9b. As shown, substantially all noise 422 has been eliminated.

With the threshold voltage detection system 300 shown in FIG. 5 in the apparatus 2, the voltage at the output terminal 172 appears as shown in FIG. 9c. In operational terms, the amplifier 302 does not conduct until the voltage appearing at its input terminals 304, 306 exceeds a positive threshold voltage or a negative threshold voltage. These threshold voltages are determined by the potentiometers 316, 320, respectively. Thus, the threshold voltage detector system 300 is a wave shaping system, transforming the decaying sinusodal signal into a series of decaying positive and negative pulse signals.

The voltage signal at output terminal 172 now enters valid signal detection means 8. Valid signal detection means 8 is a significant feature of the present invention because it establishes characteristics of a valid signal, i.e., a signal representing a legitimate ignition firing, in addition to amplitude.

To be accepted as a valid signal, four criteria must be met. First, the signal must have a peak amplitude of one polarity (either positive or negative) exceeding a first predetermined value. Second, this first peak must be followed by a second peak of opposite polarity exceeding the second predetermined value. Third, the two peaks must occur within a predetermined time interval or window. And fourth, the signal must be separated from other signals by a predetermined period of time.

The peak amplitude determination is accomplished by means of the peak level discriminators 180, 182. These peak level discriminators 180, 182 operate as comparators, comparing the positive and negative peaks of the voltage appearing at output terminal 172 to predetermined voltage settings, generally indicated in FIG. 1 as +X and −Y. The voltage settings +X and −Y are adjustably determined by potentiometers 200, 214, respectively.

The peak level discriminators 180, 182 operate in a similar fashion, except for the opposite polarity. That is, as the voltage at the positive input terminal 184 of the positive peak level discriminator 180 approaches and exceeds the threshold setting +X, the voltage at the output terminal 188 begins to rise and go positive. Thus, only a voltage signal having a positive peak which exceeds +X will develop a positive voltage signal at the output terminal 188 of the discriminator 180. Similarly, only a voltage signal having a negative peak less than −Y will generate a positive voltage at the output terminal 194 of the peak level discriminator 182.

The voltages +X and −Y are also shown generally on FIG. 9c. These values are dependent upon the filtering and amplifying parameters of the apparatus 2.

The "time window" determination is accomplished by means of the monostable multivibrators 202, 216 which operate in conjunction with the peak level discriminators 180, 182, respectively. In operation, the monostable multivibrator 202 will generate a pulse of predetermined duration when the voltage at the output terminal 188 of the peak level discriminator 180 is positive. Similarly, the monostable multivibrator 216 will generate a pulse of predetermined duration when the voltage at the output terminal 194 is positive, corresponding to a negative peak less than the −Y voltage setting. These pulses are shown in FIG. 9d and 9e.

As shown, the pulse generated by the monostable multivibrator 216 is phase shifted with respect to the pulse generated by the monostable multivibrator 202. These pulses, as previously discussed, are inputs to the coincidence gate 244. Thus, if the pulse duration is substantially equal to the desired time window, the time window criterium is met only when the pulses "overlap" as inputs to the coincidence gate 224.

Applicants have discovered that an appropriate time window is in the range of one quarter to three quarters of the period of the resonating voltage signal 420. Thus, the monostable multivibrators 202, 216 are designed to generate pulses of this duration.

The fourth criterium is effectuated by blanking means 225, which comprises the monostable multivibrator 230. The overlap of pulses in the coincidence gate 224 causes the monostable multivibrator 230 to generate a pulse of predetermined duration. This pulse is shown in FIG. 9f and inherently forbids acceptance of any voltage signal for the duration of the pulse generated. That is, during the period in which the monostable multivibrator 230 is "on", the previously described circuitry is rendered inoperative. Thus, the duration of the pulse generated by the monostable multivibrator 230 determines the amount of time which must exist between valid signals.

This pulse duration is determined by the maximum RPM at which the automobile is to be tested. Applicants have found that a duration of approximately 2.2 milliseconds is appropriate is most situations. This corresponds to approximately 3500 RPM for an eight cylinder automobile.

The output of blanking means 225 triggers the monostable multivibrator 250. The function of the monostable multivibrator 250 is to generate a 100 micro-second pulse which causes the dumping or resetting of the voltage on the timing capacitor 266. This is accomplished by the inverting amplifier 258 and the transistor 262. Once inverted, the pulse is suitable to base drive the transistor 262 to the "on" state. During this 100 microsecond interval, the transistor 262 saturates and dumps or resets the voltage on the timing capacitor 266 to approximately minus 15 volts.

Upon completion of the 100 micro-second dump pulse, the transistor 262 is completely turned "off". The timing capacitor 266 now recharges exponentially toward positive 15 volts through one of the resistors 268, 270, 272, previously chosen.

When the voltage on the timing capacitor 266 is negative (below ground), the operational amplifier 280 generates a positive output voltage at the output terminal 286. After the voltage on the timing capacitor 266 passes ground on its positive climb, the output voltage of the operational amplifier 280 switches to a quiescent negative value. The clamping diode 290 limits the maximum voltage on the timing capacitor 266 to positive 0.7 volts.

The time width of the positive pulse generated at output terminal 286 is determined by the time constant of the timing capacitor 266 and the chosen resistor 268, 270, or 272. The number of positive pulses is determined by the dump frequency, i.e., the pulse repetition rate of monostable multivibrator 250.

In the quiescent state, i.e., when the voltage at output terminal 286 is negative, the transistor switch 292 is "off" and no current passes through the display meters 296, 298. When a positive voltage is present at output terminal 286, the transistor switch 292 is "on", and current is delivered to the display meters 296, 298.

The capacitor 266, resistors 268, 270, 272, operational amplifier 280, transistor 292, therefore, define signal generator means, generally designated 424 in FIG. 1, for producing a meter-driving signal. The switches 274, 276, 278 define means for adjusting the meter-driving signal.

The amount of current flowing in the display meters 296, 298 is averaged and results in a needle deflection. The reading of the display meters 296, 298 therefore corresponds directly to the frequency of radiation signals from the automobile which are trapped by the antenna 16.

Speed band detection means 328, shown in FIG. 6, is used to indicate when the measured RPM of the automobile 416 lies within a given range. This is accomplished by averaging the output of the operational amplifier 280 and by comparing this average to 2 voltages representing the RPM range limits.

As previously discussed, the averaging is achieved by means of the balanced diode bridge gate 330. The filters 338, 340 remove any ripple on the rectified voltage signal by a process of integration.

The rectified signal is fed to the comparators 342, 344. The comparators 342, 344 are biased by means of the variable voltage supply 358, which provides two adjustable biasing voltages corresponding to the speed band extremes.

The comparator 342 is the minimum speed comparator and is so biased. The comparator 344 is the maximum speed comparator.

If the average speed rectified signal lies within the specified range, there is an output voltage at the output terminals 350, 356 of the comparators 342, 344. These output voltages are gated by the diode AND gate 364. Gating turns "on" the amplifier 366, which lights the indication lamp 368.

This invention has been described with particular reference to preferred embodiments thereof. It should be understood that the detailed description is illustrative only and various changes and modifications may be made without departing from the true scope and spirit of the present invention.

What we claim is:

1. Apparatus for measuring the rate of operation of an internal combustion engine which emits valid electromagnetic radiation signals at a repetition rate corresponding to the rate of operation, comprising, in combination:
    antenna input means having a predetermined resonant frequency for producing in response to each of the radiation signals a resonant signal at the resonant frequency having a positive voltage amplitude peak and a negative voltage amplitude peak;
    valid signal detection means for generating a control pulse in response to each resonant signal having a positive voltage amplitude peak greater than a predetermined voltage, a negative voltage amplitude peak less than a second predetermined voltage and a time period between the positive and negative voltage amplitude peaks less than a predetermined time so that valid electromagnetic radiation signals are distinguished from noise signals; and
    output means responsive to the repetition rate of the control pulses for indicating the rate of operation of the engine.
2. Apparatus, as claimed in claim 1, wherein the antenna input means comprises a tunable tank circuit.
3. Apparatus, as claimed in claim 1, wherein the predetermined resonant frequency is within the range of 5 kilohertz to 30 kilohertz.
4. Apparatus, as claimed in claim 3, wherein the predetermined resonant frequency is about 10 kilohertz.
5. Apparatus, as claimed in claim 1, wherein the valid signal detection means comprises filter means for passing a predetermined band of frequencies including the predetermined resonant frequency and for attenuating all frequencies outside the predetermined band.
6. Apparatus, as claimed in claim 1, wherein the valid signal detection means comprises:
    first voltage level discriminator means for commencing the production of a first output pulse at the time the positive voltage amplitude peak of the resonant signal becomes greater than the first predetermined voltage and for continuing the production of the first output pulse for a first predetermined time interval;
    second voltage level discriminator means for commencing the production of a second output pulse at the time the negative voltage amplitude peak of the resonant signal becomes less than the second predetermined voltage and for continuing the production of the second output pulse for a second predetermined time interval; and
    coincidence means for producing the control pulse in response to the simultaneous production of the first output pulse and the second output pulse.
7. Apparatus, as claimed in claim 6, wherein the first predetermined time interval is between one quarter and three quarters of the period of time defined by the inverse of the predetermined resonant frequency.
8. Apparatus, as claimed in claim 1, wherein the valid signal detection means comprises blanking means for blanking said valid signal detection means for a predetermined time interval.
9. Apparatus, as claimed in claim 8, wherein the blanking means comprises means for extending the duration of the control pulse for the predetermined time interval.
10. Apparatus, as claimed in claim 1, wherein the output means comprises:

signal generator means for producing a meter signal in response to each control pulse;

adjustment means for varying the duration of the meter signals according to the characteristics of the internal combustion engine; and a meter for indicating the rate of operation of the internal combustion engine in response to the duration and repetition rate of the meter signals.

11. In a system including an internal combustion engine operated by a plurality of spark discharge devices fired by current pulses producing electromagnetic radiation pulses, apparatus for measuring the operating speed of the engine, comprising:

antenna means for converting the radiation pulses into corresponding electrical signals;

tunable means for passing the electrical signals from the antenna means having frequencies in the audio range and for attenuating the electrical signals from the antenna means having frequencies outside the audio range;

valid signal detection means for generating a control pulse in response to the passed electrical signals having an amplitude exceeding a predetermined value and having a period less than a predetermined time interval; and output means responsive to the repetition rate of the control pulses for indicating the operating speed of the engine.

12. Apparatus, as claimed in claim 11, wherein the tunable means comprises tank circuit means connected to the antenna means and having a resonant frequency in the audio range for producing a series of decaying resonant signals in response to each radiation pulse received by the antenna means.

13. Apparatus, as claimed in claim 12, wherein the resonant frequency is within the range of 5 kilohertz to 30 kilohertz.

14. Apparatus, as claimed in claim 13, wherein the predetermined resonant frequency is about 10 kilohertz.

15. Apparatus, as claimed in claim 11, wherein the tunable means comprises filter means for attenuating all frequencies outside a predetermined frequency band.

16. Apparatus, as claimed in claim 11, wherein the output means comprises:

signal generator means for producing a meter signal in response to each control pulse;

adjustment means for varying the duration of the meter signals according to the characteristics of the internal combustion engine; and a meter for indicating the speed of the internal combustion engine in response to the duration and repetition rate of the meter signals.

17. Apparatus, as claimed in claim 11, wherein the antenna means is electromagnetically coupled to the engine along an unobstructed straight-line path through the atmosphere.

18. Apparatus for measuring the operating speed of an internal combustion engine operated by a plurality of spark discharge devices fired by current pulses producing electromagnetic radiation pulses, comprising, in combination:

antenna means for converting the radiation pulses into corresponding electrical signals;

tunable means for passing the electrical signals from the antenna means having frequencies in the audio range and for attenuating the electrical signals from the antenna means having frequencies outside the audio range;

valid signal detection means for generating a control pulse in response to the passed electrical signals having an amplitude exceeding a predetermined value and having a period less than a predetermined time interval; and output means responsive to the repetition rate of the control pulses for indicating the operating speed of the engine.

19. Apparatus, as claimed in claim 18, wherein the tunable means comprises tank circuit means connected to the antenna means and having a resonant frequency in the audio range for producing a series of decaying resonant signals in response to each radiation pulse received by the antenna means.

20. Apparatus, as claimed in claim 19, wherein the predetermined resonant frequency is within the range of 5 kilohertz to 30 kilohertz.

21. Apparatus, as claimed in claim 20, wherein the predetermined resonant frequency is about 10 kilohertz.

22. Apparatus, as claimed in claim 18, wherein the tunable means comprises filter means for attenuating all frequencies outside the predetermined frequency band.

23. Apparatus, as claimed in claim 18, wherein the output means comprises:

signal generator means for producing a meter signal in response to each control pulse;

adjustment means for varying the duration of the meter signals according to the characteristics of the internal combustion engine; and a meter for indicating the speed of the internal combustion engine in response to the duration and repetition rate of the meter signals.

24. Apparatus, as claimed in claim 18, wherein the antenna means is electromagnetically coupled to the engine along an unobstructed straight line path through the atmosphere.

25. A method for measuring the rate of operation of an internal combusion engine having an ignition system, the ignition system intermittently emitting a series of electromagnetic radiation signals at a rate proportional to the rate of operation, comprising, in combination, the steps of:

receiving the electromagnetic radiation signals;

developing a voltage signal having an amplitude peak in response to the radiation signals;

attenuating all signals having a frequency outside the upper sonic range;

generating a control pulse whenever the amplitude peaks of two successive voltage signals exceed a predetermined value and the period between the two successive voltage signals is less than a predetermined time period; and displaying in response to the repetition rate of the control pulses the rate of operation.

26. The method of claim 25 including between the attenuating step and the generating step the additional step of comparing the amplitude peak to the predetermined value.

27. A method for measuring by means of an antenna having a resonant frequency in the audio range, the rate of operation of an internal combustion engine having an ignition system, the ignition system intermittently emitting a series of electromagnetic radiation signals at a rate proportional to the rate of operation, comprising, in combination, the steps of:
placing the antenna in the vicinity of the engine;
receiving the electromagnetic radiation signals;
developing a resonating voltage signal having an amplitude peak in response to each radiation signal;
attenuating all signals having a frequency outside the audio range;
generating a control pulse whenever the amplitude peaks of two successive voltage signals exceed a predetermined value and the period between the two successive voltage signals is less than a predetermined time period; and
displaying in response to the repetition rate of the control pulses the rate of operation.

28. The method of claim 27 wherein the resonant frequency is in the range of 5 kilohertz to 30 kilohertz.

29. The method of claim 28 wherein the resonant frequency is approximately 10 kilohertz.

* * * * *